US012415370B2

(12) United States Patent
Naramatsu et al.

(10) Patent No.: US 12,415,370 B2
(45) Date of Patent: Sep. 16, 2025

(54) DRYING DEVICE AND PRINTING APPARATUS

(71) Applicant: SEIKO EPSON CORPORATION, Tokyo (JP)

(72) Inventors: Yasuo Naramatsu, Matsumoto (JP); Naotoshi Yanagidaira, Chino (JP)

(73) Assignee: Seiko Epson Corporation, Tokyo (JP)

( * ) Notice: Subject to any disclaimer, the term of this patent is extended or adjusted under 35 U.S.C. 154(b) by 299 days.

(21) Appl. No.: 18/168,278

(22) Filed: Feb. 13, 2023

(65) Prior Publication Data

US 2023/0294420 A1 Sep. 21, 2023

(30) Foreign Application Priority Data

Feb. 16, 2022 (JP) ................................ 2022-021889

(51) Int. Cl.
*B41J 11/00* (2006.01)

(52) U.S. Cl.
CPC ................................ *B41J 11/00222* (2021.01)

(58) Field of Classification Search
CPC .............. B41J 11/0022; B41J 11/00222; B41J 11/00224; B41J 29/377; B41M 7/009; B65H 2301/517; F26B 3/04; F26B 3/30; F26B 3/283; F26B 21/001; D06P 5/02; D06P 5/30; D06C 7/00; D06B 15/00; D06B 15/09
USPC .............................................. 347/17, 18, 102
See application file for complete search history.

(56) References Cited

U.S. PATENT DOCUMENTS

| | | | | |
|---|---|---|---|---|
| 2011/0037819 | A1* | 2/2011 | Mizutani | B41J 11/0022 347/108 |
| 2019/0184717 | A1 | 6/2019 | Tsuji et al. | |
| 2021/0107275 | A1* | 4/2021 | Peeters | B41J 11/0085 |

FOREIGN PATENT DOCUMENTS

| | | | | |
|---|---|---|---|---|
| JP | 2002361850 A | * 12/2002 | | |
| JP | 2018192690 A | * 12/2018 | | B41J 11/0015 |
| JP | 2019007714 A | * 1/2019 | | B41J 11/00216 |
| JP | 2019-107822 A | 7/2019 | | |

OTHER PUBLICATIONS

English translation of JP-2002361850-A (Year: 2002).*
English translation of JP-2019007714-A (Year: 2019).*

* cited by examiner

*Primary Examiner* — Leslie J Evanisko
*Assistant Examiner* — Thomas Ray Knief
(74) *Attorney, Agent, or Firm* — WORKMAN NYDEGGER

(57) ABSTRACT

A drying device includes a support unit, a heating unit, and a control unit. The heating unit includes a duct, which has a blowing outlet, a suction inlet, and an air port and includes an air flow path, a heating section, a blower, and a first adjustment unit capable of adjusting an amount of air flowing into the air flow path from an outside of the duct through the air port. The control unit is capable of executing a first mode in which the first adjustment unit is controlled to adjust the amount of air in a state in which the heating section performs heating and a second mode in which the first adjustment unit is controlled to cause the amount of air to be more than the amount of air in the first mode in a state in which heating by the heating section is stopped.

8 Claims, 4 Drawing Sheets

DRYING DEVICE AND PRINTING APPARATUS

The present application is based on, and claims priority from JP Application Serial Number 2022-021889, filed Feb. 16, 2022, the disclosure of which is hereby incorporated by reference herein in its entirety.

BACKGROUND

1. Technical Field

The present disclosure relates to a drying device and a printing apparatus.

2. Related Art

A drying device described in JP-A-2019-107822 includes a heating unit that heats a medium supported on a support surface. The heating unit includes a heating section that heats a medium, a housing being an example of a duct, an air flow path, and a blower for sending air through the air flow path. A suction inlet and a blowing outlet are formed in the housing. The suction inlet and the blowing outlet are opened toward the support surface, and communicate with the air flow path. The air flowing through the air flow path is discharged through the blowing outlet to a region between the heating unit and the support surface. Part of the air in the region between the heating unit and the support surface flows through the suction inlet into the air flow path. In this manner, the air circulates between the region between the heating unit and the support surface, and the air flow path.

In the drying device, even when heating of the heating section is stopped after completion of drying of the medium, a temperature of the air in the region between the heating unit and the support surface is not likely to be lowered. Therefore, a thermal damage may be caused to the medium supported on the support surface.

SUMMARY

In order to solve the above-mentioned problem, a drying device includes a support unit configured to support, on a support surface, a medium transported after printing, a heating unit facing the support surface and being configured to heat the medium supported on the support surface after printing, and a control unit configured to control the heating unit, wherein the heating unit includes a duct having a blowing outlet through which air is blown out toward the support surface, a suction inlet through which the air blown out through the blowing outlet toward the support surface is sucked, and an air port being different from the blowing outlet and the suction inlet, and including an air flow path through which the air is flowable, a heating section configured to heat at least one of the air in the air flow path and the medium supported on the support surface, a blower configured to cause the air in the air flow path to flow toward the blowing outlet, and a first adjustment unit configured to adjust an amount of air flowing into the air flow path from an outside of the duct through the air port, the duct has a facing region facing the support surface and a non-facing region not facing the support surface, the air port is provided in the non-facing region, and the control unit is configured to execute a first mode in which the first adjustment unit is controlled to adjust the amount of air in a state in which the heating section performs heating and a second mode in which the first adjustment unit is controlled to cause the amount of air to be more than the amount of air in the first mode in a state in which heating by the heating section is stopped.

In order to solve the above-mentioned problem, a printing apparatus includes a transport unit configured to transport a medium, a printing unit configured to perform printing on the medium transported by the transport unit, a support unit configured to support, on a support surface, the medium after printing performed by the printing unit, a heating unit facing the support surface and being configured to heat the medium supported on the support surface after printing, and a control unit configured to control the heating unit, wherein the heating unit includes a duct having a blowing outlet through which air is blown out toward the support surface, a suction inlet through which the air blown out through the blowing outlet toward the support surface is sucked, and an air port being different from the blowing outlet and the suction inlet, and including an air flow path through which the air is flowable, a heating section configured to heat at least one of the air in the air flow path and the medium supported on the support surface, a blower configured to cause the air in the air flow path to flow toward the blowing outlet, and a first adjustment unit configured to adjust an amount of air flowing into the air flow path from an outside of the duct through the air port, the duct has a facing region facing the support surface and a non-facing region not facing the support surface, the air port is provided in the non-facing region, and the control unit is configured to execute a first mode in which the first adjustment unit is controlled to adjust the amount of air in a state in which the heating section performs heating and a second mode in which the first adjustment unit is controlled to cause the amount of air to be more than the amount of air in the first mode in a state in which heating by the heating section is stopped.

DESCRIPTION OF EXEMPLARY EMBODIMENTS

Figure 1:
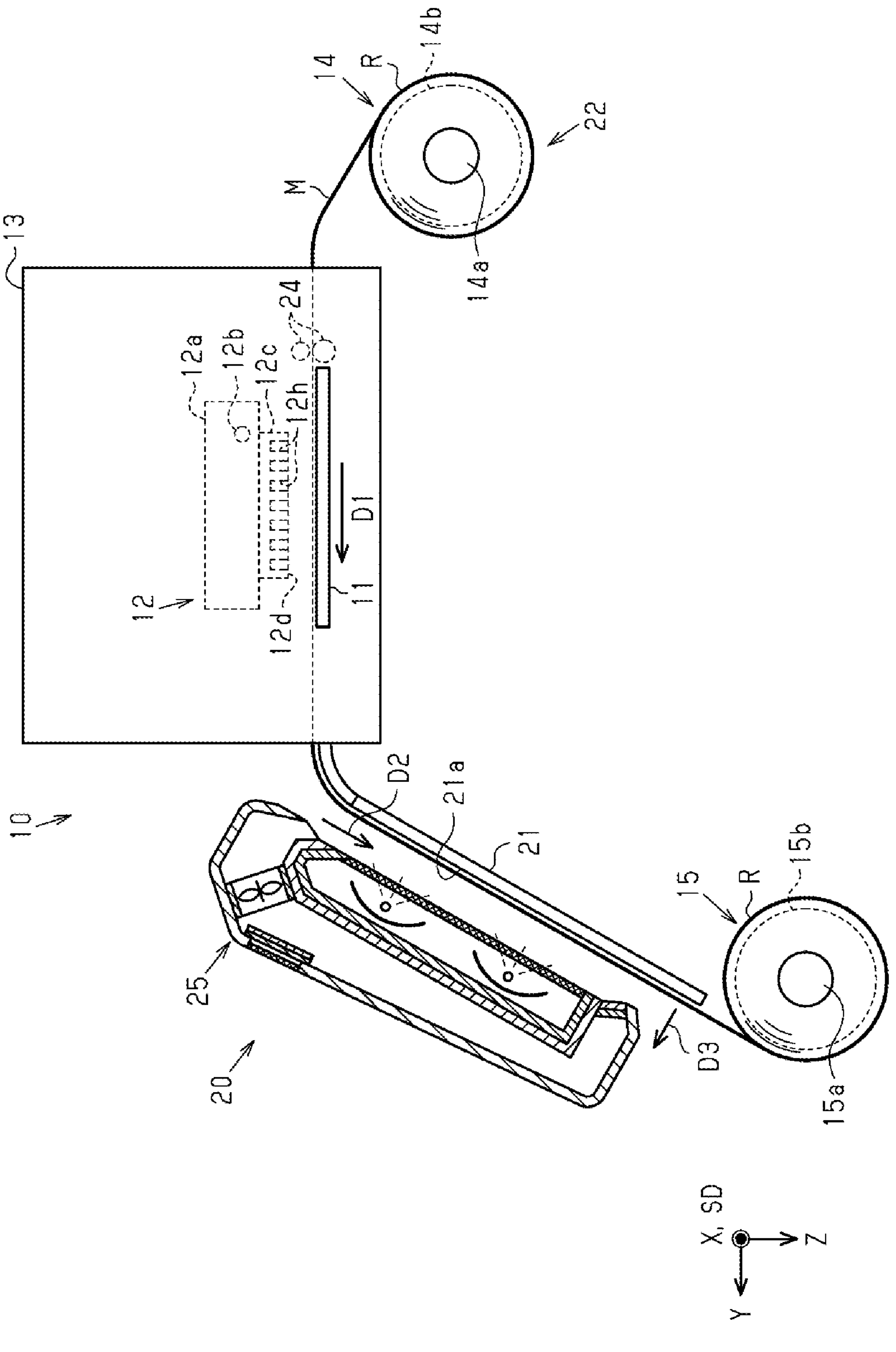
FIG. 1 is a schematic view illustrating a printing apparatus according to an exemplary embodiment.

A drying device and a printing apparatus according to an exemplary embodiment are described below with reference to the drawings. The printing apparatus is, for example, an ink-jet type printer that performs printing by ejecting ink being an example of a liquid onto a medium such as paper, fabric, vinyl, a plastic component, and a metal component.

In the drawings, the direction of gravity is indicated by a Z axis while assuming that the printing apparatus is placed on a horizontal plane, and directions along the horizontal plane are indicated by an X axis and a Y axis. The X axis, the Y axis, and the Z axis are orthogonal to one another. A direction parallel to the X axis is also referred to as a width direction X. A direction parallel to the Y axis is also referred to as a depth direction Y. A direction parallel to the Z axis is also referred to as a vertical direction Z.

Printing Apparatus

As illustrated in FIG. 1, a printing apparatus 10 may include a housing 13. The printing apparatus 10 includes a printing unit 12 that performs printing on a medium M. The printing unit 12 may be positioned inside the housing 13. The width direction X is also a width direction of the medium M. The printing unit 12 may include a carriage 12*a* that moves in a scanning direction SD and a guide shaft 12*b* that has a rod-like shape and extends in the width direction X. The scanning direction SD may be a direction parallel to the X axis. The carriage 12*a* is supported by the guide shaft 12*b*. The carriage 12*a* is reciprocable along the guide shaft 12*b* by driving a motor, which is not illustrated. The carriage 12*a* and the guide shaft 12*b* are away above from the medium M transported by a transport unit 22.

The printing unit 12 may include a recording head 12*c* that performs recording on the medium M. The recording head 12*c* has a nozzle surface 12*d* in which a nozzle 12*h* is opened. The recording head 12*c* is mounted on the carriage 12*a*. The recording head 12*c* moves together with the carriage 12*a*, and thus performs scanning in the scanning direction SD. The recording head 12*c* may perform recording on the medium M by ejecting ink being an example of a liquid from the nozzle 12*h* onto the medium M. The recording head 12*c* in the present exemplary embodiment is a serial type that performs printing while moving in the width direction X of the medium M. The recording head 12*c* may be configured as a line type that is provided in the width direction X of the medium M.

The printing apparatus 10 may include a printing support 11. The printing support 11 is positioned inside the housing 13. The printing support 11 is positioned below the recording head 12*c*. The medium M is transported in an upstream transport direction D1 along the upper surface of the printing support 11. The upstream transport direction D1 is a direction along the upper surface of the printing support 11 and the length direction of the medium M.

Feeding Unit

The printing apparatus 10 may include a feeding unit 14. The feeding unit 14 feeds the medium M. The feeding unit 14 includes a support shaft 14*a* and a feeding motor 14*b*. The support shaft 14*a* rotatably supports a roll body R. The roll body R is the medium M wound in a roll shape. The feeding motor 14*b* is a power source that rotates the support shaft 14*a*. The feeding motor 14*b* drives the support shaft 14*a* to rotate, and thus the feeding unit 14 feeds out the elongated medium M from the roll body R. The feeding unit 14 feeds out the medium M from the roll body R to the inside of the housing 13.

Transport Unit

The printing apparatus 10 includes the transport unit 22 that transports the medium M. The printing unit 12 performs printing on the medium M transported by the transport unit 22. In other words, the printing unit 12 performs printing on the medium M transported by the transport unit 22.

The transport unit 22 may include a transport motor, which is not illustrated, and a transport roller pair 24. In the drawing, the transport roller pair 24 being one pair is illustrated. Alternatively, the transport unit 22 may include a plurality of transport roller pairs 24. The transport roller pair 24 may rotate in a state of sandwiching the medium M to transport the medium M. The transport motor is intermittently driven, and thus the transport unit 22 in the present exemplary embodiment intermittently transports the medium M. A transport operation performed by the transport unit 22 may be performed alternatingly with a printing operation performed by the printing unit 12.

Winding Unit

The printing apparatus 10 may include a winding unit 15. The winding unit 15 winds, into a roll shape, the medium M subjected to printing by the printing unit 12. The winding unit 15 includes a winding shaft 15*a* and a winding motor 15*b*. The winding shaft 15*a* rotatably supports the roll body R. The roll body R at the winding unit 15 is the medium M after printing, which is wound in a roll shape. The winding motor 15*b* is a driving source of the winding shaft 15*a*. The winding motor 15*b* drives the winding shaft 15*a* to rotate, and thus the winding unit 15 winds the medium M. The winding motor 15*b* may be driven at timing later than driving of the feeding motor 14*b*, and the driving thereof may be stopped at a timing later than stoppage of the driving of the feeding motor 14*b*.

Drying Device

The printing apparatus 10 includes a drying device 20. The drying device 20 includes a support unit 21. In other words, it can also be understood that the printing apparatus 10 includes the support unit 21. The support unit 21 may be positioned outside the housing 13. The support unit 21 has a support surface 21*a*. The support unit 21 supports, on the support surface 21*a*, the medium M after printing, which is subjected to printing performed by the printing unit 12. The support surface 21*a* may extend between the housing 13 and the winding unit 15. The dimension of the support surface 21*a* in the width direction X may be larger than the dimension of the medium M in the width direction X.

The medium M is transported in a transport direction D2 along the support surface 21*a*. The transport direction D2 is a direction along the support surface 21*a* and the length direction of the medium M. The support surface 21*a* may extend so as to be displaced in the depth direction Y and inclined downward in the vertical direction Z as approaching downstream in the transport direction D2. In this case, the medium M transported along the support surface 21*a* is displaced in the depth direction Y and transported downward in the vertical direction Z as approaching downstream in the transport direction D2.

Heating Unit

Figure 2:
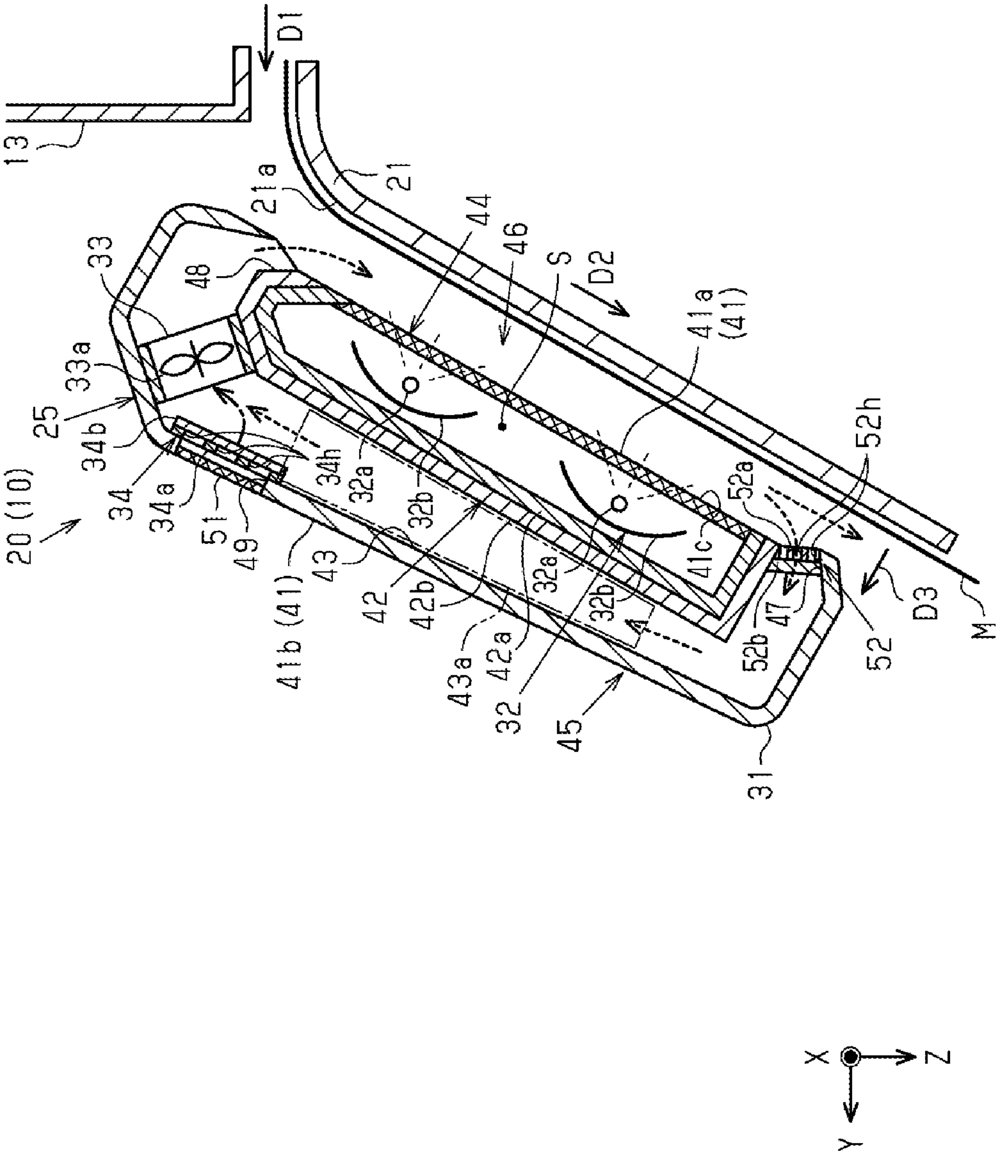
FIG. 2 is a cross-sectional view illustrating a drying device.

As illustrated in FIG. 2, the drying device 20 includes a heating unit 25. In other words, it can also be understood that the printing apparatus 10 includes the heating unit 25. The heating unit 25 faces the support surface 21*a*. The heating unit 25 heats the medium M after printing, which is supported on the support surface 21*a*. The heating unit 25 includes a duct 31, a heating section 32, a blower 33, and a first adjustment unit 34. The heating unit 25 may have a partition wall 42. The heating unit 25 may include a second adjustment unit 52.

Duct

The duct 31 may have an outer wall 41. A space is defined and formed inside the duct 31 with the outer wall 41. The partition wall 42 may be positioned inside the duct 31. A part of the outer wall 41 and the partition wall 42 form an air flow path 43 through which air can flow. The air flow path 43 is formed inside the duct 31. In other words, the duct 31 includes the air flow path 43.

The outer wall 41 of the duct 31 may have a first outer wall 41*a* and a second outer wall 41*b*. The first outer wall 41*a* may have a flat plate shape. The first outer wall 41*a* may cause the air to be communicable. For example, the shape of the first outer wall 41*a* may be a mesh-like shape or a shape in which a plurality of through holes are formed. The second outer wall 41*b* is positioned to surround the first outer wall 41*a*.

The first outer wall 41*a* has a first outer surface 41*c*. The first outer surface 41*c* is an outer surface of the first outer wall 41*a*. The first outer surface 41*c* is a surface facing the support surface 21*a*. The first outer surface 41*c* may be parallel to the support surface 21*a*. The first outer surface 41*c* and the support surface 21*a* are positioned away from each other. A direction orthogonal to the support surface 21*a* is referred to as an orthogonal direction D3. The orthogonal direction D3 may be a direction orthogonal to the first outer surface 41*c*. The first outer surface 41*c* may face the support surface 21*a* in the orthogonal direction D3.

The partition wall 42 contains a heat insulating material 42*a*. Specifically, the partition wall 42 may be formed of the heat insulating material 42*a* and an inner wall 42*b*. The heat insulating material 42*a* is formed of a material having a heat insulating effect higher than the inner wall 42*b*. The inner wall 42*b* is formed of the same material as the outer wall 41. The heat insulating material 42*a* and the inner wall 42*b* may be in contact with each other. The inner wall 42*b* may be positioned between the heat insulating material 42*a* and the second outer wall 41*b*.

The end of the partition wall 42 may be positioned between the end of the first outer wall 41*a* and the end of the second outer wall 41*b*. The end of the partition wall 42 may be fixed to the first outer wall 41*a*. The second outer wall 41*b* and the partition wall 42 may form the air flow path 43. The partition wall 42 and the first outer wall 41*a* may define and form an internal space S inside the duct 31. The internal space S may be adjacent to the air flow path 43 through intermediation of the partition wall 42.

The duct 31 has a facing region 44 that faces the support surface 21*a* and a non-facing region 45 that does not face the support surface 21*a*. The facing region 44 in the present exemplary embodiment is formed of the entire first outer wall 41*a* and the end of the second outer wall 41*b*. The non-facing region 45 in the present exemplary embodiment is formed of a part of the second outer wall 41*b*, which does not form the facing region 44. The facing region 44 is away from the support surface 21*a* in the orthogonal direction D3. A region between the facing region 44 and the support surface 21*a* is referred to as a region 46. The region 46 is a region between the heating unit 25 and the support surface 21*a*.

Suction Inlet

A suction inlet 47 is provided in the duct 31. The suction inlet 47 communicates with the air flow path 43. In other words, the air flow path 43 has the suction inlet 47. The suction inlet 47 is a through hole formed in the outer wall 41. The inside and the outside of the duct 31 are communicable through the suction inlet 47.

The suction inlet 47 may be provided in the facing region 44. The suction inlet 47 may be provided to the second outer wall 41*b* at a position below the first outer wall 41*a*. The suction inlet 47 may communicate with the end of the air flow path 43. Part of the air in the region 46 can flow through the suction inlet 47 into the air flow path 43.

Blowing Outlet

A blowing outlet 48 through which the air is blown out toward the support surface 21*a* is formed in the duct 31. The blowing outlet 48 communicates with the air flow path 43. In other words, the air flow path 43 has the blowing outlet 48. The blowing outlet 48 is a through hole formed in the outer wall 41. The inside and the outside of the duct 31 are communicable through the blowing outlet 48.

The blowing outlet 48 is provided in the facing region 44. The blowing outlet 48 may be provided to the second outer wall 41*b* at a position above the first outer wall 41*a*. The blowing outlet 48 may communicate with an end of both the ends of the air flow path 43 with which the suction inlet 47 does not communicate. The air flowing through the suction inlet 47 into the air flow path 43 flows toward the blowing outlet 48. In other words, the blowing outlet 48 communicates with downstream of the suction inlet 47 in a flowing direction in which the air flows through the air flow path 43. The suction inlet 47 is formed so as to such the air blown out through the blowing outlet 48 onto the support surface 21*a* therethrough.

Air Port

An air port 49 that is different from the blowing outlet 48 and the suction inlet 47 is formed in the duct 31. The air port 49 communicates with the air flow path 43. In other words, the air flow path 43 has the air port 49. The air port 49 is a through hole formed in the outer wall 41. The inside and the outside of the duct 31 are communicable through the air port 49.

The air port 49 is provided in the non-facing region 45. The air port 49 may be provided to the second outer wall 41*b* at a position away from the suction inlet 47 and the blowing outlet 48. The air port 49 communicates between the suction inlet 47 and the blowing outlet 48 in the air flow path 43.

A removal member 51 may be provided inside the air port 49. In other words, the drying device 20 may include the removal member 51. For example, the removal member 51 may have a mesh-like shape. For example, heat resistant plastic or a filter may be adopted as the removal member 51. The removal member 51 removes a foreign matter from the air flowing through the air port 49.

Heating Section

The heating section 32 heats the medium M supported on the support surface 21*a*. The heating section 32 heats the surface of the medium M supported on the support surface 21*a*, and thus causes the printing unit 12 to evaporate moisture of the liquid adhering to the medium M. With this, the medium M to which the liquid adheres is dried.

The heating section 32 may be arranged in the internal space S of the duct 31. In other words, the partition wall 42 provides partition between the air flow path 43 and the heating section 32 inside the duct 31. The heating section 32 may heat the medium M supported on the support surface 21*a*, via the first outer wall 41*a*. The heating section 32 is aligned with a part of the air flow path 43 through intermediation of the partition wall 42 in the orthogonal direction D3. A portion of the air flow path 43, which is aligned with the heating section 32 through intermediation of the partition wall 42 in the orthogonal direction D3, is referred to as a parallel installation portion 43*a*. Note that the air port 49 is in communication with the air flow path downstream of the parallel installation portion 43*a* in the flowing direction in which the air flows through the air flow path 43.

The heating section 32 may include a heat generating element 32*a* and a reflecting plate 32*b*. Examples of the heat generating element 32*a* include a heater pipe, a halogen lamp, and the like. The heat generating element 32*a* and the reflecting plate 32*b* extend in the width direction X. The heating section 32 may include a plurality of heat generating elements 32*a* and a plurality of reflecting plates 32*b*. The heat generating element 32*a* is away from the first outer wall 41*a* in the orthogonal direction D3. The reflecting plate 32*b* reflects heat radiated from the heat generating element 32*a*. The reflecting plate 32*b* is positioned between the heat generating element 32*a* and the partition wall 42 in the orthogonal direction D3. The reflecting plate 32*b* surrounds the back side of the heat generating element 32*a*. The heat radiated from the heat generating element 32*a* to the back side is reflected by the reflecting plate 32*b* toward the first outer wall 41*a*. With this, the heat is radiated from the first outer wall 41*a* toward the support surface 21*a*.

Blower

The blower 33 causes the air in the air flow path 43 to flow toward the blowing outlet 48. The blower 33 may be arranged in the middle of the air flow path 43. The position of the blower 33 in the air flow path 43 may be downstream of the communication position of the air port 49 in the air flow path 43. The blower 33 may include a fan 33*a*. The blower 33 may rotate the fan 33*a* to generate an air flow flowing toward the blowing outlet 48. Along the air flow generated by the blower 33, the air flows through the air flow path 43 from the suction inlet 47 to the blowing outlet 48, and is also blown out through the blowing outlet 48. In addition to heating of the medium M by the heating section 32, blowing of the air onto the medium M by the blower 33 is performed. With this, the heating unit 25 performs drying of the medium M.

First Adjustment Unit

The first adjustment unit 34 is capable of adjusting an amount of air flowing into the air flow path 43 from the outside of the duct 31 through the air port 49. Hereinafter, the amount of air flowing into the air flow path 43 from the outside of the duct 31 through the air port 49 is also referred to as an amount of air A. The first adjustment unit 34 may be positioned in the air flow path 43. The first adjustment unit 34 may include a first main body portion 34*a* in which an air hole 34*h* is formed and a first closing member 34*b* capable of closing the air hole 34*h*.

The first main body portion 34*a* may be positioned along the inner surface of the second outer wall 41*b* from the inside of the duct 31 so as to close the air port 49. The air hole 34*h* is a through hole passing through the first main body portion 34*a*. The air port 49 and the air flow path 43 communicate with each other through the air hole 34*h*. A plurality of air holes 34*h* may be provided in the first main body portion 34*a*.

The first closing member 34*b* can be displaced by a motor, which is not illustrated. Displacement of the first closing member 34*b* enables switching between a state in which the first closing member 34*b* closes the air hole 34*h* and a state in which the air hole 34*h* is opened.

The number of air holes 34*h* to be opened may be adjusted by adjusting the position of the first closing member 34*b*. It can be said that, as the number of air holes 34 closed by the first closing member 34*b* is greater, the opening degree of the air port 49 of the duct 31 is smaller. It can be said that, when the first closing member 34*b* closes all the air holes 34*h* in the first adjustment unit 34, the air port 49 is in a fully closed state. It can be said that, as the number of opened air holes 34 is greater, the opening degree of the air port 49 of the duct 31 is larger. It can be said that, when all the air holes 34*h* in the first adjustment unit 34 are opened, the air port 49 is in a fully opened state.

Second Adjustment Unit

The second adjustment unit 52 is capable of adjusting the opening degree of the suction inlet 47. The second adjustment unit 52 may be positioned in the air flow path 43. The second adjustment unit 52 may include a second main body portion 52*a* in which a suction hole 52*h* is formed and a second closing member 52*b* capable of closing the suction hole 52*h*. The second main body portion 52*a* may be positioned inside the duct 31 so as to close the suction inlet 47. The suction hole 52*h* is a through hole passing through the second main body portion 52*a*. The region 46 and the air flow path 43 communicate with each other through the suction hole 52*h*. A plurality of suction holes 52*h* may be formed in the second main body portion 52*a*. The second closing member 52*b* may be positioned in the air flow path 43. The second closing member 52*b* can be displaced by a motor, which is not illustrated. Displacement of the second closing member 52*b* enables switching between a state in which the second closing member 52*b* closes the suction hole 52*h* and a state in which the suction hole 52*h* is opened.

The number of suction holes 52*h* to be opened may be adjusted by adjusting the position of the second closing member 52*b*. It can be said that, as the number of suction holes 52*h* closed by the second closing member 52*b* is greater, the opening degree of the suction inlet 47 of the duct 31 is smaller. It can be said that, when the second closing member 52*b* closes all the suction holes 52*h* in the second adjustment unit 52, the suction inlet 47 is in a fully closed state. It can be said that, as the number of suction holes 52*h* is greater, the opening degree of the suction inlet 47 of the duct 31 is larger. It can be said that, when all the suction holes 52*h* in the second adjustment unit 52 are opened, the suction inlet 47 is in a fully opened state.

Temperature Detection Unit and Humidity Detection Unit

Figure 3:
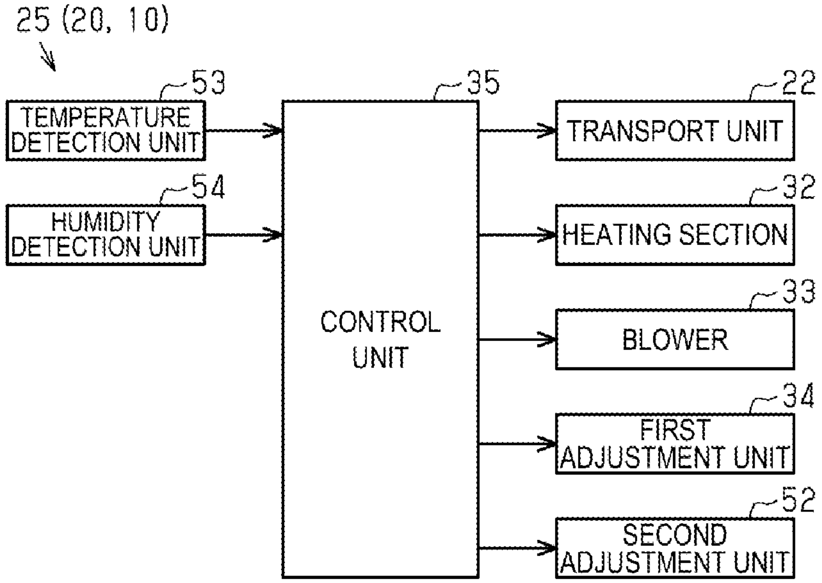
FIG. 3 is a block diagram illustrating an electrical configuration of the printing apparatus and the drying device.

As illustrated in FIG. 3, the heating unit 25 may include a temperature detection unit 53. The temperature detection unit 53 detects an outside air temperature T. The heating unit 25 may include a humidity detection unit 54. The humidity detection unit 54 detects humidity H in the region 46 between the heating unit 25 and the support surface 21*a*. The humidity detection unit 54 may detect outside air humidity H1 being humidity of the outside air, in addition to the humidity H in the region 46.

Control Unit

The printing apparatus 10 includes a control unit 35. The control unit 35 controls various operations executed in the printing apparatus 10. The control unit 35 controls the heating unit 25. It can also be understood that the drying device 20 includes the control unit 35.

The control unit 35 may be configured as a circuit including α: one or more processors that perform various processes according to a computer program, β: one or more dedicated hardware circuits that perform at least some of the various processes, or γ: a combination thereof. The hardware circuit is, for example, an application-specific integrated circuit. The processor includes a CPU and a memory such as RAM and ROM, and the memory stores a program code or a command configured to cause the CPU to perform the process. The memory, that is, a computer readable medium includes all kinds of readable media accessible by a general purpose or dedicated computer.

The control unit 35 may be electrically coupled to the transport unit 22. When a printing condition is satisfied, the control unit 35 may drive the transport motor of the transport unit 22. The printing condition may be satisfied when a printing instruction is input in response to an operation of the operation unit, which is not illustrated. The printing condition may be satisfied when a printing instruction is input from a terminal device, which is not illustrated. When the transport motor is driven, the transport unit 22 transports the medium M.

The control unit 35 causes the transport unit 22 to perform intermittent transport and thus to transport the medium M. Intermittent transport is a switching operation between transport of the medium M by the transport unit 22 and stoppage of transport of the medium M in a predetermined cycle. Further, when transport of the medium M is stopped during intermittent transport, the control unit 35 causes the printing unit 12 to perform printing on the medium M.

The control unit 35 may be electrically coupled to the heating section 32. The control unit 35 may perform switching heat generation and stoppage of heat generation of the heat generating element 32*a*. The heat generating element 32*a* is heated, and thus the control unit 35 causes the heating section 32 to perform heating. Heat generation of the heat generating element 32*a* is stopped, and thus the control unit 35 stops heating by the heating section 32.

The control unit 35 may be electrically coupled to the blower 33. The control unit 35 may perform switching between driving and stoppage of driving of the blower 33. When the blower 33 is driven, the fan 33*a* of the blower 33 rotates, and thus the air flow flowing toward the blowing outlet 48 is generated. The control unit 35 may control an amount of the air in the air flow path 43, which flows from the blower 33 toward the blowing outlet 48, by adjusting a rotation speed of the fan 33*a* of the blower 33. The amount of the air in the air flow path 43, which flows from the blower 33 toward the blowing outlet 48 is increased as the rotation speed of the fan 33*a* is higher.

The control unit 35 may be electrically coupled to the first adjustment unit 34. The control unit 35 may adjust the position of the first closing member 34*b* of the first adjustment unit 34. In the present exemplary embodiment, the control unit 35 adjusts the number of opened air holes 34*h* by adjusting the position of the first closing member 34*b*. In other words, the control unit 35 is capable of controlling the opening degree of the air port 49 by controlling the first adjustment unit 34.

The control unit 35 may be electrically coupled to the second adjustment unit 52. The control unit 35 may adjust the position of the second closing member 52*b* of the second adjustment unit 52. In the present exemplary embodiment, the control unit 35 adjusts the number of the opened suction hole 52*h* by adjusting the position of the second closing member 52*b*. In other words, the control unit 35 may be capable of controlling the opening degree of the suction inlet 47 by controlling the second adjustment unit 52.

The control unit 35 may be electrically coupled to the temperature detection unit 53. The control unit 35 may be capable of controlling the blower 33 and the first adjustment unit 34, based on the outside air temperature T detected by the temperature detection unit 53.

The control unit 35 may not be electrically coupled to the humidity detection unit 54. The control unit 35 may be capable of controlling the blower 33 and the first adjustment unit 34, based on the humidity H detected by the humidity detection unit 54.

The control unit 35 is capable of executing a first mode M1 and a second mode M2. The first mode M1 and the second mode M2 are processing relating to heating of the medium M supported on the support surface 21*a*. Next, the first mode M1 and the second mode M2 are described. Here, the step order in each of the modes may be switched in a freely selective manner without departing from the purpose of each of the modes.

First Mode

Figure 4:
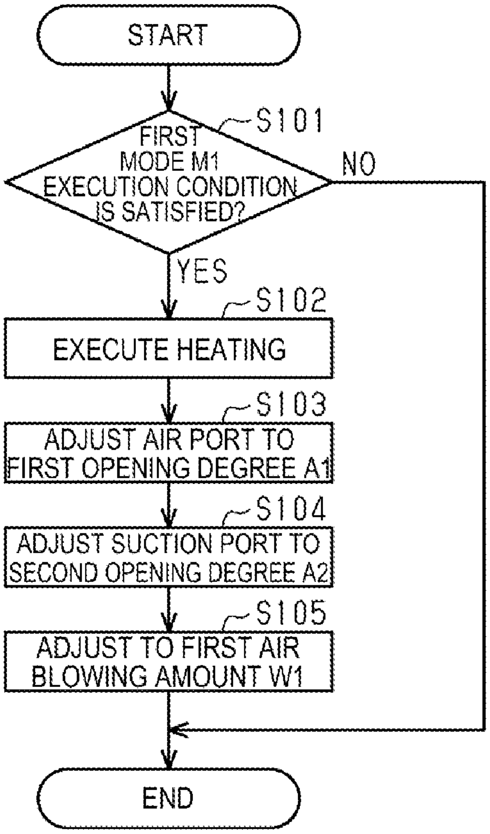
FIG. 4 is a flowchart showing a first mode execution routine.

With reference to FIG. 4, a routine of the first mode M1 is described. The first mode M1 may be executed in a cycle in a state in which power of the printing apparatus 10 is turned on.

As illustrated in FIG. 4, in Step S101, the control unit 35 determines whether the execution condition of the first mode M1 is satisfied. Here, when printing is being performed, the control unit 35 determines that the execution condition of the first mode M1 is satisfied. It is determined that the execution condition of the first mode M1 is not satisfied, which is NO in Step S101. The control unit 35 terminates the routine of the first mode M1. The control unit 35 determines that the execution condition of the first mode M1 is satisfied, which is YES in Step S101. The control unit 35 proceeds the processing to Step S102.

In Step S102, the control unit 35 causes the heating section 32 to perform heating. In Step S103, the control unit 35 controls the first adjustment unit 34 to adjust the air port 49 to a first opening degree A1. The first opening degree A1 is a set value that is set in advance. In the present exemplary embodiment, the air port 49 adjusted to the first opening degree A1 is in a fully closed state. In Step S104, the control unit 35 controls the second adjustment unit 52 to adjust the suction inlet 47 to a second opening degree A2. The second opening degree A2 is a set value that is set in advance. In the present exemplary embodiment, the suction inlet 47 adjusted to the second opening degree A2 is in a fully opened state.

In Step S105, the control unit 35 controls the blower 33 to adjust an air blowing amount of the blower 33 to a first air blowing amount W1. The first air blowing amount W1 is a set value that is set in advance. In the present exemplary embodiment, when the air blowing amount of the blower 33 is adjusted to the first air blowing amount W1, the rotation speed of the fan 33*a* of the blower 33 is set to a predetermined rotation speed. The control unit 35 terminates the routine of the first mode M1.

The control unit 35 controls the first adjustment unit 34 in the first mode M1 so as to adjust the amount of air A in a state in which heating is performed by the heating section 32. The control unit 35 controls the second adjustment unit 52 in the first mode M1 so as to open the suction inlet 47.

Second Mode

Figure 5:
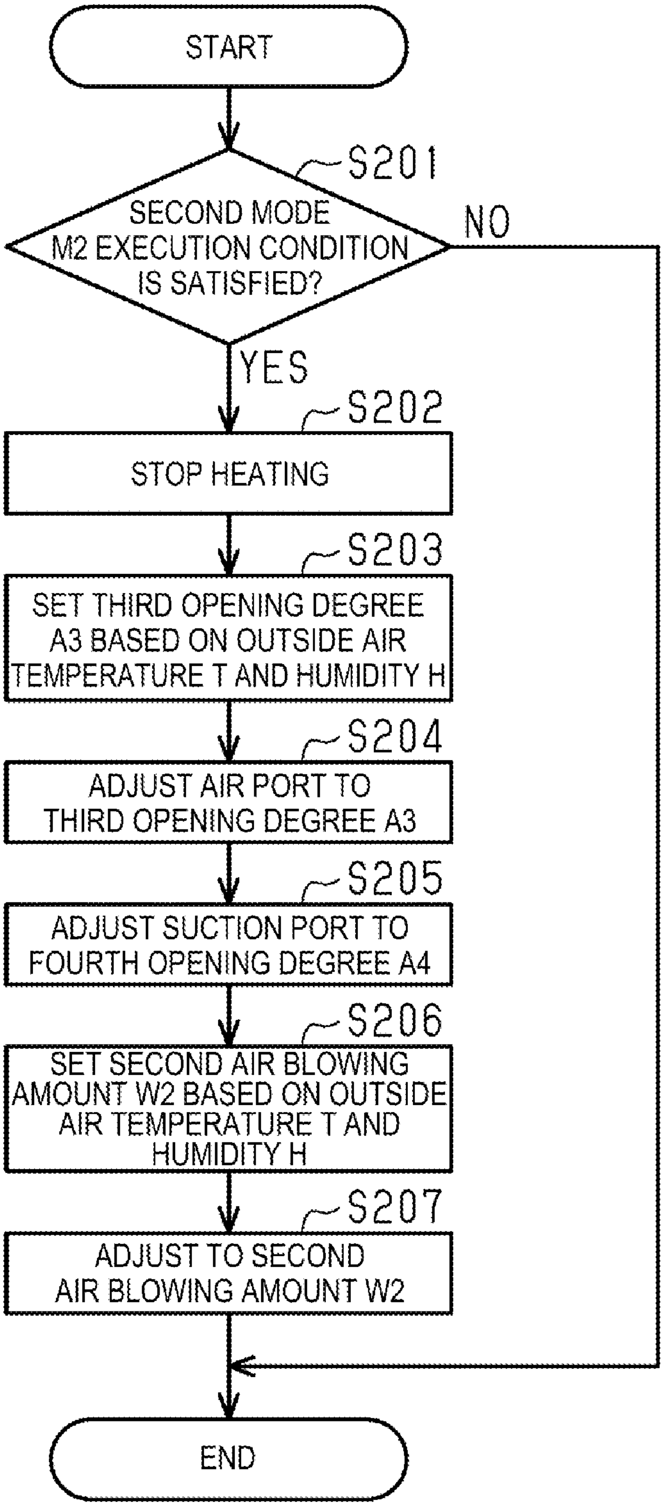
FIG. 5 is a flowchart showing a second mode execution routine.

With reference to FIG. 5, a routine of the second mode M2 is described. The second mode M2 may be executed in a cycle in a state in which power of the printing apparatus 10 is turned on.

As illustrated in FIG. 5, in Step S201, the control unit 35 determines whether the execution condition of the second mode M2 is satisfied. Here, when printing is not being performed, the control unit 35 determines that the execution condition of the second mode M2 is satisfied. The control unit 35 determines that the execution condition of the second mode M2 is not satisfied, which is NO in Step S201. The control unit 35 terminates the routine of the second mode M2. The control unit 35 determines that the execution condition of the second mode M2 is satisfied, which is YES in Step S201. The control unit 35 proceeds the processing to Step S202. In Step S202, the control unit 35 stops heating by the heating section 32.

In Step S203, the control unit 35 sets a third opening degree A3, based on the outside air temperature T and the humidity H. The third opening degree A3 is an opening degree larger than the first opening degree A1. In the present exemplary embodiment, the air port 49 adjusted to the third opening degree A3 has an opening degree between a fully closed state and a fully opened state, or is in a fully opened state. When the third opening degree A3 set by the control unit 35 is compared with that under the same condition of the humidity H, there is established such a relationship that the third opening degree A3 is larger as the outside air temperature T is higher. The control unit 35 sets the third opening degree A3 based on the comparison result between the humidity H and the outside air humidity H1. When the third opening degree A3 set by the control unit 35 is compared with that under the same condition of the outside air temperature T, there is established such a relationship that the third opening degree A3 when the humidity H in the region 46 is equal to or higher than the outside air humidity H1 is larger than the third opening degree A3 when the humidity H in the region 46 is lower than the outside air humidity H1. When the humidity H in the region 46 is equal to or higher than the outside air humidity H1, the third opening degree A3 may be a larger opening degree as a value difference between the humidity H in the region 46 and the outside air humidity H1 is greater. When the humidity H in the region 46 is lower than the outside air humidity H1, the third opening degree A3 may be a smaller opening degree as a value difference between the humidity H in the region 46 and the outside air humidity H1 is greater. In Step S204, the control unit 35 controls the first adjustment unit 34 to adjust the air port 49 to the third opening degree A3.

In Step S205, the control unit 35 controls the second adjustment unit 52 to adjust the suction inlet 47 to a fourth opening degree A4. The fourth opening degree A4 is a set value that is set in advance. The fourth opening degree A4 is an opening degree smaller than the second opening degree A2. In the present exemplary embodiment, the suction inlet 47 adjusted to the fourth opening degree A4 has an opening degree between a fully closed state and a fully opened state.

In Step S206, the control unit 35 sets a second air blowing amount W2, based on the outside air temperature T and the humidity H. The second air blowing amount W2 is a value greater than the first air blowing amount W1. In the present exemplary embodiment, when the air blowing amount of the blower 33 is adjusted to the second air blowing amount W2, the rotation speed of the fan 33*a* of the blower 33 is set higher than the rotation speed that achieves the first air blowing amount W1. In the present exemplary embodiment, when the second air blowing amount W2 set by the control unit 35 is compared with that under the same condition of the humidity H, there is established such a relationship that the second air blowing amount W2 is larger as the outside air temperature T is higher. The control unit 35 sets the second air blowing amount W2 based on the humidity H in the region 46. When the second air blowing amount W2 set by the control unit 35 is compared with that under the same condition of outside air temperature T, there is established such a relationship that the second air blowing amount W2 is larger as the humidity H in the region 46 is higher.

In Step S207, the control unit 35 controls the blower 33 to adjust the air blowing amount of the blower 33 to the second air blowing amount W2. The control unit 35 terminates the routine of the second mode M2.

In Step S202, in the second mode M2, the control unit 35 stops heating by the heating section 32. In Step S204, the control unit 35 adjusts the air port 49 to the third opening degree A3. The third opening degree A3 is an opening degree larger than the first opening degree A1. Thus, the amount of air A obtained through the air port 49 set to the third opening degree A3 is larger than the amount of air A obtained through the air port 49 set to the first opening degree A1. Therefore, it can be said that, in the second mode M2, the control unit 35 controls the first adjustment unit 34 so that the amount of air A is larger than the amount of air A in the first mode M1 in a state in which heating by the heating section 32 is stopped.

In Step S203, the control unit 35 sets the third opening degree A3 based on the outside air temperature T. When the third opening degree A3 set by the control unit 35 is compared with that under the same condition of the humidity H, there is established such a relationship that the third opening degree A3 is larger as the outside air temperature T is higher. Thus, the amount of air A obtained through the air port 49 set to the third opening degree A3 is larger as the outside air temperature T is higher. Therefore, it can be said that, in the second mode M2, the control unit 35 controls the first adjustment unit 34 so that the amount of air A at a first temperature T1 being the outside air temperature T detected by the temperature detection unit 53 is larger than the amount of air A at a second temperature T2 lower than the first temperature T1.

In Step S203, the control unit 35 sets the third opening degree A3, based on the humidity H. Therefore, it can be said that, in the second mode M2, the control unit 35 controls the first adjustment unit 34, based on the result detected by the humidity detection unit 54.

In Step S206, the control unit 35 sets the second air blowing amount W2, based on the outside air temperature T. In Step S207, the control unit 35 adjusts the air blowing amount of the blower 33 to the second air blowing amount W2. When the second air blowing amount W2 set by the control unit 35 is compared with that under the same condition of the humidity H, there is established such a relationship that the second air blowing amount W2 is larger as the outside air temperature T is higher. Thus, the air flowing toward the blowing outlet 48 by the blower 33 whose blowing amount is set to the second air blowing amount W2 is larger as the outside air temperature T is higher. Therefore, it can be said that, in the second mode M2, the control unit 35 controls the blower 33 so that, when the outside air temperature T detected by the temperature detection unit 53 is the first temperature T1, the air larger than that at the second temperature T2 flows toward the blowing outlet 48.

In Step S206, the control unit 35 sets the second air blowing amount W2, based on the humidity H. Therefore, it can be said that, in the second mode M2, the control unit 35 controls the blower 33, based on the result detected by the humidity detection unit 54.

In Step S205, the control unit 35 adjusts the suction inlet 47 to the fourth opening degree A4. The fourth opening degree A4 is an opening degree smaller than the second opening degree A2. Thus, the amount of the air flowing from the region 46 into the air flow path 43 through the suction inlet 47 set to the fourth opening degree A4 is smaller than the amount of the air obtained through the suction inlet 47 set to the second opening degree A2. Therefore, it can be said that the control unit 35 controls the second adjustment unit 52 so that the opening degree of the suction inlet 47 in the second mode M2 is smaller than the opening degree of the suction inlet 47 in the first mode M1.

Actions of Exemplary Embodiment

Actions of the exemplary embodiment are described.

As illustrated in FIG. 2, in the first mode M1, the heating section 32 performs heating. In the first mode M1, along with heating of the heating section 32, a temperature of the air in the region 46 rises. Along with the rise of the temperature of the air in the region 46, the medium M supported on the support surface 21*a* is heated. In this manner, the surface of the medium M supported on the support surface 21*a* is heated, and thus the printing unit 12 is caused to evaporate moisture of the liquid adhering to the medium M. With this, the medium M to which the liquid adheres is dried.

In the first mode M1, driving of the blower 33 causes the air to flow in the air flow path 43. In the first mode M1, the second adjustment unit 52 adjusts the opening degree of the suction inlet 47 so that the suction inlet 47 is in a fully opened state. With this, along with driving of the blower 33, part of the air in the region 46 through the suction inlet 47 into the air flow path 43. The temperature of the air in the region 46 rises due to heating by the heating section 32. Along with driving of the blower 33, the air flowing through the suction inlet 47 into the air flow path 43 flows toward the blowing outlet 48 in the air flow path 43. Part of the air flowing in the air flow path 43 is discharged through the blowing outlet 48 toward the region 46. Part of the air blown out to the region 46 through the blowing outlet 48 flows downstream in the transport direction D2 along the support surface 21*a*. In this manner, the air that is heated by the heating section 32 in the region 46 circulates between the air flow path 43 and the region 46.

In particular, in the first mode M1, the first adjustment unit 34 adjusts the opening degree of the air port 49 so that the air port 49 in a fully closed state. Thus, the air flowing through the air port 49 into the air flow path 43 is suppressed. The air flowing through the air port 49 into the air flow path 43 has a temperature lower than the temperature of the air in the region 46 between the heating unit 25 and the support surface 21*a*. Therefore, the air flowing through the air port 49 into the air flow path 43 is suppressed, and thus temperature fall of the air in the air flow path 43 can be suppressed. Along with this, temperature fall of the air blowing out through the blowing outlet 48 toward the support surface 21*a* can be suppressed.

Meanwhile, in the second mode M2, heating by the heating section 32 is stopped which is different from the first mode M1. Along with this, the temperature of the air in the region 46 does not rise, and hence the temperature of the air in the region 46 is lower in the second mode M2, as compared to the temperature in the first mode M1. Therefore, excessive heating by the heating section 32 with respect to the medium M transported along the support surface 21*a* can be suppressed. Thus, a thermal damage caused to the medium M supported on the support surface 21*a* can be suppressed.

Further, in the second mode M2, driving of the blower 33 also causes the air to flow in the air flow path 43 similarly to the first mode M1. In the second mode M2, the second adjustment unit 52 adjusts the opening degree of the suction inlet 47 so that the opening degree of the suction inlet 47 is smaller than the opening degree of the suction inlet 47 in the first mode M1. With this, the amount of the air flowing from the region 46 into the air flow path 43 through the suction inlet 47 along with driving of the blower 33 is smaller than that in the first mode M1. In this manner, the air that is heated by the heating section 32 in the region 46 is less likely to circulate between the air flow path 43 and the region 46.

Further, in the second mode M2, the first adjustment unit 34 adjusts the opening degree of the air port 49 so as to open the air port 49. With this, along with driving of the blower 33, part of the outside air flows through the air port 49 into the air flow path 43. Part of the outside air flowing through the air port 49 into the air flow path 43 along with driving of the blower 33 flows toward the blowing outlet 48 in the air flow path 43. Part of the air flowing in the air flow path 43 is discharged through the blowing outlet 48 toward the region 46. Part of the air blown out to the region 46 through the blowing outlet 48 flows downstream in the transport direction D2 along the support surface 21*a*. In this manner, the outside air flowing through the air port 49 into the air flow path 43 is blown to the region 46. The temperature of the outside air flowing through the air port 49 into the air flow path 43 is lower than the temperature in the air in the region 46. Therefore, the outside air flowing through the air port 49 into the air flow path 43 is discharged through the blowing outlet 48 to the region 46, and thus temperature fall of the air flow path 43 can be promoted. Along with this, temperature fall of the air blowing out through the blowing outlet 48 toward the support surface 21*a* can be promoted. Further, the air that is heated by the heating section 32 in the region 46 is discharged downstream in the transport direction D2 from the region 46.

Effects of Exemplary Embodiment

Effects of the exemplary embodiment are described.

(1) The first adjustment unit 34 is capable of adjusting the amount of air A flowing into the air flow path 43 from the outside of the duct 31 through the air port 49. The air port 49 is provided in the non-facing region 45 of the duct 31, which does not face the support surface 21*a*. Thus, the air having a temperature lower than the air in the region 46 between the heating unit 25 and the support surface 21*a* can flow through the air port 49 into the air flow path 43. In the first mode M1, heating by the heating section 32 is performed, and the first adjustment unit 34 adjusts the amount of air A. In the second mode M2, heating by the heating section 32 is stopped, and the first adjustment unit 34 performs adjustment so that the amount of air A in the second mode M2 is larger than the amount of air A in the first mode M1. Thus, in the second mode M2, the temperature of the air that flows in the air flow path 43 and is discharged through the blowing outlet 48 toward the support surface 21*a* can be lowered than that in the first mode M1. In the second mode M2, the temperature of the air in the region 46 between the heating unit 25 and the support surface 21*a* is easily lowered. Therefore, a thermal damage caused to the medium M transported along the support surface 21*a* can be suppressed.

(2) In the second mode M2, the control unit 35 controls the first adjustment unit 34 so that the amount of air A at a first temperature T1 being the outside air temperature T detected by the temperature detection unit 53 is larger than the amount of air A at a second temperature T2 lower than the first temperature T1. In the second mode M2, the air flowing through the air port 49 into the air flow path 43 at the outside air temperature T being the first temperature T1 is larger than that at the second temperature T2 lower than the first temperature T1. Thus, even when the temperature of the air flowing through the air port 49 into the air flow path 43 is relatively high, the air that flows in the air flow path 43 and is discharged through the blowing outlet 48 toward the support surface 21*a* is increased. With this, the temperature of the air in the region 46 between the heating unit 25 and the support surface 21*a* is easily lowered. Therefore, a thermal damage caused to the medium M transported along the support surface 21*a* can suitably be suppressed in accordance with the outside air temperature T.

(3) In the second mode M2, when the outside air temperature T detected by the temperature detection unit 53 is the first temperature T1, the control unit 35 controls the blower 33 so that the air larger than that in the second temperature T2 flows toward the blowing outlet 48. In the second mode M2, the amount of the air in the air flow path 43, which flows toward the blowing outlet 48, at the outside air temperature T being the first temperature T1 is larger than that at the second temperature T2 lower than the first temperature T1. Thus, even when the temperature of the air flowing through the air port 49 into the air flow path 43 is relatively high, the air that flows in the air flow path 43 and is discharged through the blowing outlet 48 toward the support surface 21*a* is increased. With this, the temperature of the air in the region 46 between the heating unit 25 and the support surface 21*a* is easily lowered. Therefore, a thermal damage caused to the medium M transported along the support surface 21*a* can suitably be suppressed to a further extent in accordance with the outside air temperature T.

(4) The heating unit 25 includes the humidity detection unit 54 that detects the humidity H in the region 46 between the heating unit 25 and the support surface 21*a*. In the second mode M2, the control unit 35 controls the blower 33 and the first adjustment unit 34, based on the result detected by the humidity detection unit 54. Therefore, in the second mode M2, the blower 33 and the first adjustment unit 34 can be controlled based on the humidity H in the region 46 between the heating unit 25 and the support surface 21*a*.

(5) The second adjustment unit 52 is capable of adjusting the opening degree of the suction inlet 47. As the opening degree of the suction inlet 47 adjusted by the second adjustment unit 52 is larger, the air flowing from the region 46 between the heating unit 25 and the support surface 21*a* through the suction inlet 47 into the air flow path 43 is increased. In the second mode M2, the second adjustment unit 52 performs adjustment so that the opening degree of the suction inlet 47 is smaller than the opening degree of the suction inlet 47 in the first mode M1. Thus, the opening degree of the suction inlet 47 in the first mode M1 is adjusted to an opening degree larger than that in the second mode M2, and hence the warm air in the region 46 between the heating unit 25 and the support surface 21*a* easily flows through the suction inlet 47 into the air flow path 43. Therefore, the temperature of the air flowing in the air flow path 43 can be raised. Thus, the air discharged through the blowing outlet 48 from the air flow path 43 toward the support surface 21*a* easily raises the temperature of the air in the region 46 between the heating unit 25 and the support surface 21*a*. Therefore, evaporation of moisture of the liquid adhering to the medium M transported along the support surface 21*a* and drying of the medium M to which the liquid adheres can further be promoted. The suction inlet 47 in the second mode M2 is adjusted to have an opening degree smaller than the opening degree of the suction inlet 47 in the first mode M1. Thus, the warm air in the region 46 between the heating unit 25 and the support surface 21*a* is less likely to flow through the suction inlet 47 into the air flow path 43. Therefore, rise of the temperature of the air flowing in the air flow path 43 can be suppressed. Thus, the air discharged through the blowing outlet 48 from the air flow path 43 toward the support surface 21*a* easily lowers the temperature of the air in the region 46 between the heating unit 25 and the support surface 21*a*. Therefore, a thermal damage caused to the medium M transported along the support surface 21*a* can further be suppressed.

(6) The air port 49 is in communication with the air flow path downstream of the parallel installation portion 43*a* being a portion of the air flow path 43, which is aligned with the heating section 32 through intermediation of the partition wall 42 in the orthogonal direction D3 orthogonal to the support surface 21*a*. Thus, the air flowing through the air port 49 from the outside of the duct 31 into the air flow path 43 is less likely to flow through the parallel installation portion 43*a*. Therefore, the cooler air can be discharged through the blowing outlet 48 from the air flow path 43 toward the support surface 21*a*.

(7) The partition wall 42 that separates the air flow path 43 and the heating section 32 contains the heat insulating material 42*a*. Thus, the air flowing through the air port 49 from the outside of the duct 31 into the air flow path 43 is less likely to be heated by the heating section 32. Therefore, the cooler air can be discharged through the blowing outlet 48 from the air flow path 43 toward the support surface 21*a*.

(8) The drying device 20 includes the removal member 51 that removes a foreign matter from the air flowing through the air port 49. Thus, a foreign matter can be prevented from entering the air flow path 43 through the air port 49.

(9) In the second mode M2, when the outside air temperature T detected by the temperature detection unit 53 is the first temperature T1, the control unit 35 controls the first adjustment unit 34 so that the amount of air A is larger than that at the second temperature T2 lower than the first temperature T1. In the second mode M2, the air flowing through the air port 49 into the air flow path 43 at the outside air temperature T being the second temperature T2 is smaller than that at the first temperature T1 higher than the second temperature T2. Thus, when the outside air temperature T is the second temperature T2, the temperature of the air flowing in the air flow path 43 is less likely to be lowered as compared to a case in which the outside air temperature T is the first temperature T1. Therefore, in a state in which the outside air temperature T is low enough to satisfactorily suppress a thermal damage caused to the medium M with a little amount of air A, the first adjustment unit 34 adjusts the amount of air A to be smaller. With this, the duct 31 can be maintained under a heated state. A subsequent first mode M1 can be executed in a state in which the duct 31 is warmed. Thus, the temperature of the air blown out from the air flow path 43 through the suction inlet 47 onto the support surface 21*a* can be raised rapidly.

Modified Examples

The exemplary embodiment described above may be modified as follows. The exemplary embodiment and modified examples thereof to be described below may be implemented in combination within a range in which a technical contradiction does not arise.

The printing apparatus 10 may include an encoder that detects a driving amount of the transport motor. In other words, the drying device 20 may include an encoder. The control unit 35 may acquire a transport position of the medium M from a detection value of the encoder. The control unit 35 may determine, based on the acquired transport position of the medium M, whether transport of the medium M is started before a predetermined time period longer than a stoppage time of intermittent transport elapses. The execution condition of the first mode M1 may include that transport of the medium M is started before the predetermined time period elapses. When printing is being performed, and transport of the medium M is started before the predetermined time period elapses, the control unit 35 may determine that the execution condition of the first mode M1 is satisfied. The execution condition of the second mode M2 may include that transport of the medium M is not started before the predetermined time period elapses. When printing is being performed, and transport of the medium M is not started before the predetermined time period elapses, the control unit 35 may determine that the execution condition of the second mode M2 is satisfied.

The position at which the removal member 51 is provided is not limited to the inside of the air port 49. For example, the removal member 51 may be provided to the outside of the duct 31 so as to close the opening of the air port 49 oriented to the outside of the duct 31. The removal member 51 may be provided to the inside of the duct 31 so as to close the opening of the air port 49 oriented to the inside of the duct 31.

The removal member 51 may be omitted from the drying device 20.

The heat insulating material 42*a* may be away from the inner wall 42*b*. The heat insulating material 42*a* may be positioned between the inner wall 42*b* and the second outer wall 41*b*.

The entire partition wall 42 may be the heat insulating material 42*a*. In this case, the partition wall 42 also contains the heat insulating material 42*a*.

The heat insulating material 42*a* may be omitted from the partition wall 42. In this case, for example, the entire partition wall 42 may be the inner wall 42*b*. In this case, along with heating by the heating section 32, the heat easily propagates to the air in the air flow path 43 via the partition wall 42. Thus, the heating section 32 heats the air in the air flow path 43.

The air port 49 may communicate with the parallel installation portion 43*a* or communicate with upstream of the parallel installation portion 43*a* in the air flow path 43.

The communication position of the air port 49 with the air flow path 43 is not limited to a position between the suction inlet 47 and the blowing outlet 48.

The suction inlet 47 may be provided in the non-facing region 45 as long as the air in the region 46 can flow through the suction inlet 47 into the air flow path 43.

The blowing outlet 48 may be provided in the non-facing region 45 as long as the air can be blown out toward the support surface 21*a*.

The partition wall 42 may be omitted from the heating unit 25. In this case, for example, the space that is not partitioned by the partition wall 42 is formed inside the duct 31. The heating section 32 and the air flow path 43 may be positioned in the space inside the duct 31.

The control unit 35 may control the second adjustment unit 52 so that the suction inlet 47 is not opened in the second mode M2. When the suction inlet 47 in this case is adjusted to the fourth opening degree A4, the suction inlet 47 is in a fully closed state. In the second mode M2, the air in the region 46 does not flow through the suction inlet 47 into the air flow path 43.

The installation position of the second adjustment unit 52 is not limited to the air flow path 43. For example, the second adjustment unit 52 may be positioned outside of the duct 31. The second adjustment unit 52 includes the second main body portion 52*a* in which the suction hole 52*h* is formed and the second closing member 52*b* capable of closing the suction hole 52*h*, but is not limited thereto. For example, the second adjustment unit 52 may include an opening/closing valve capable of opening and closing the suction inlet 47. With this displacement of the opening/closing valve, the suction inlet 47 may be adjusted to be in a fully closed state or a fully opened state, or have an opening degree between a fully closed state and a fully opened state.

The second adjustment unit 52 may be omitted from the heating unit 25. When any one of the first mode M1 and the second mode M2 is executed, the suction inlet 47 in this case is opened in a fully opened state. Step S104 may be omitted from the routine illustrated in FIG. 4. Step S205 may be omitted from the routine illustrated in FIG. 5.

In the second mode M2, the control unit 35 may control only one of the blower 33 and the first adjustment unit 34, based on the result detected by the humidity detection unit 54. In the second mode M2, when the control unit 35 controls only the blower 33, based on the result detected by the humidity detection unit 54, the processing in Step S203 in the routine illustrated in FIG. 5 may be changed to the processing for setting the third opening degree A3 based on the outside air temperature T. In the second mode M2, when the control unit 35 controls only the first adjustment unit 34, based on the result detected by the humidity detection unit 54, the processing in Step S206 in the routine illustrated in FIG. 5 may be changed to the processing for setting the second air blowing amount W2 based on the outside air temperature T.

In the second mode M2, the control unit 35 may not perform control based on the result detected by the humidity detection unit 54. When the control unit 35 does not perform control based on the result detected by the humidity detection unit 54, the humidity detection unit 54 may be omitted from the heating unit 25.

In the second mode M2, the control unit 35 may select one air blowing amount from a plurality of air blowing amounts that are different from each other in a stepwise manner, in accordance with the outside air temperature T, set the selected air blowing amount as the second air blowing amount W2, and thus adjust the blower 33. Specifically, the air blowing amount at the outside air temperature T within a temperature range including the second temperature T2 is referred to as a low-temperature air blowing amount. The air blowing amount at the outside air temperature T within a temperature range including the first temperature T1 higher than the second temperature T2 is referred to as a high-temperature air blowing amount. The high-temperature air blowing amount is an air blowing amount larger than the low-temperature air blowing amount. When the outside air temperature T is within the temperature range corresponding to the high-temperature air blowing amount, the high-temperature air blowing amount is adopted as the second air blowing amount W2. When the outside air temperature T is within the temperature range corresponding to the low-temperature air blowing amount, the low-temperature air blowing amount is adopted as the second air blowing amount W2. In this case, in the second mode M2, it can also be said that the control unit 35 controls the blower 33 so that, when the outside air temperature T detected by the temperature detection unit 53 is the first temperature T1, the air larger than that at the second temperature T2 flows toward the blowing outlet 48.

The control unit 35 may not control the blower 33, based on the result detected by the temperature detection unit 53. In this case, the processing in Step S206 in the routine illustrated in FIG. 5 may be changed to the processing for setting the second air blowing amount W2 based on the humidity H.

In the second mode M2, the control unit 35 may select one opening degree from a plurality of opening degrees that are different from each other in a stepwise manner, in accordance with the outside air temperature T, set the selected opening degree as the third opening degree A3, and thus adjust the air port 49. Specifically, the opening degree at the outside air temperature T within the temperature range including the second temperature T2 is referred to as a low-temperature opening degree. The opening degree at the outside air temperature T within the temperature range including the first temperature T1 higher than the second temperature T2 is referred to as a high-temperature opening degree. The low-temperature opening degree is an opening degree smaller than the high-temperature opening degree. When the outside air temperature T is within the temperature range corresponding to the high-temperature opening degree, the high-temperature opening degree is adopted as the third opening degree A3. When the outside air temperature T is within the temperature range corresponding to the low-temperature opening degree, the low-temperature opening degree is adopted as the third opening degree. In this case, in the second mode M2, it can also be said that the control unit 35 controls the first adjustment unit 34 so that, when the outside air temperature T detected by the temperature detection unit 53 is the first temperature T1, the amount of air A is larger than the amount of air A at the second temperature T2 lower than the first temperature T1.

The control unit 35 may not control the first adjustment unit 34, based on the result detected by the temperature detection unit 53. In this case, the processing in Step S203 in the routine illustrated in FIG. 5 may be changed to the processing for setting the third opening degree A3 based on the humidity H.

In the second mode M2, the control unit 35 may control the blower 33 through use of the second air blowing amount W2 being a set value that is set in advance. The second air blowing amount W2 in this case may be a value greater than the first air blowing amount W1, a value equal to the first air blowing amount W1, or a value less than the first air blowing amount W1. In this case, the processing in Step S206 may be omitted from the routine illustrated in FIG. 5.

In the second mode M2, the control unit 35 may control the first adjustment unit 34 through use of the third opening degree A3 being a set value that is set in advance. In this case, the processing in Step S203 may be omitted from the routine illustrated in FIG. 5. The third opening degree A3 in this case is an opening degree larger than the first opening degree A1. Therefore, in this case, it can also be said that, in the second mode M2, the first adjustment unit 34 is controlled so that the amount of air A in the second mode M2 is larger than the amount of air A in the first mode M1.

In the second mode M2, the control unit 35 may not perform control based on the result detected by the temperature detection unit 53. When the control unit 35 does not perform control based on the result detected by the temperature detection unit 53, the temperature detection unit 53 may be omitted from the heating unit 25.

The installation position of the first adjustment unit 34 is not limited to the air flow path 43. For example, the first adjustment unit 34 may be positioned outside of the duct 31. The first adjustment unit 34 includes the first main body portion 34*a* in which the air hole 34*h* is formed and the first closing member 34*b* capable of closing the air hole 34*h*, but is not limited thereto. For example, the first adjustment unit 34 may include an opening/closing valve capable of opening and closing the air port 49. With this displacement of the opening/closing valve, the air port 49 may be adjusted to be in a fully closed state or a fully opened state, or have an opening degree between a fully closed state and a fully opened state.

The printing apparatus 10 may be a liquid ejection device that jets or eject a liquid other than ink. A state of the liquid ejected as a fine liquid droplet from the liquid ejection device includes a granular state, a tear drop state, a string-like shape, and the like. The liquid described herein is only required to be a material that can be ejected from the liquid ejection device. For example, the liquid may only be required to have a state in which a substance is in a liquid phase, and includes fluid such as liquid with high or low viscosity, sol, gel water, or other inorganic solvents, an organic solvent, a solution, a liquid resin, a liquid metal, and a metallic melt. The liquid includes not only a liquid being a state of a substance, but also a liquid in which particles of functional materials formed of solid materials such as pigments and metallic particles are dissolved, dispersed, or mixed in a solvent, or the like. Typical examples of the liquid include ink as described in the above-mentioned exemplary embodiment, a liquid crystal, and the like. Herein, the ink includes general aqueous ink, solvent ink, and various types of liquid compositions such as gel ink and hot-melt ink. For example, specific examples of the liquid ejection device include a device that ejects ink including materials such as an electrode material and a color material used in manufacture of liquid crystal displays, electroluminescent displays, surface light emitting displays, color filters and the like in a dispersed or dissolved form. Additionally, the liquid ejection device may be a device that ejects bioorganic substances used for biochip manufacturing, a device that is used as a precision pipette and ejects a liquid to be a sample, a printing apparatus, a micro dispenser, or the like. The liquid ejection device may be a device that ejects lubricant to a precision machine such as a clock or a camera in a pinpoint manner, and a device that ejects a transparent resin liquid such as an ultraviolet cure resin or the like on a substrate for forming a tiny hemispherical lens, an optical lens, or the like used for an optical communication element and the like. The liquid ejection device may be a device that ejects an acid or alkaline etching solution for subjecting a substrate or the like to etching.

Supplementary Note

Hereinafter, technical concepts and effects thereof that are understood from the above-described embodiment and modified examples are described.

(A) A drying device includes a support unit configured to support, on a support surface, a medium transported after printing, a heating unit facing the support surface and being configured to heat the medium supported on the support surface after printing, and a control unit configured to control the heating unit. In the drying device, the heating unit includes a duct having a blowing outlet through which air is blown out toward the support surface, a suction inlet through which the air blown out through the blowing outlet toward the support surface is sucked, and an air port being different from the blowing outlet and the suction inlet, and including an air flow path through which the air is flowable, a heating section configured to heat at least one of the air in the air flow path and the medium supported on the support surface, a blower configured to cause the air in the air flow path to flow toward the blowing outlet, and a first adjustment unit configured to adjust an amount of air flowing into the air flow path from an outside of the duct through the air port, the duct has a facing region facing the support surface and a non-facing region not facing the support surface, the air port is provided in the non-facing region, and the control unit is configured to execute a first mode in which the first adjustment unit is controlled to adjust the amount of air in a state in which the heating section performs heating and a second mode in which the first adjustment unit is controlled to cause the amount of air to be more than the amount of air in the first mode in a state in which heating by the heating section is stopped.

With this configuration, the first adjustment unit is capable of adjusting the amount of air flowing into the air flow path from the outside of the duct through the air port. The air port is provided in the non-facing region of the duct, which does not face the support surface. Thus, the air having a temperature lower than the air in the region between the heating unit and the support surface can flow through the air port into the air flow path. In the first mode, heating by the heating section is performed, and the first adjustment unit adjusts the amount of air. In the second mode, heating by the heating section is stopped, and the first adjustment unit performs adjustment so that the amount of air in the second mode is larger than the amount of air in the first mode. Thus, in the second mode, the temperature of the air that flows in the air flow path and is discharged through the blowing outlet toward the support surface can be lowered than that in the first mode, and hence, in the second mode, the temperature of the air in the region between the heating unit and the support surface is easily lowered. Therefore, a thermal damage caused to the medium transported along the support surface can be suppressed.

(B) In the drying device, the heating unit includes a temperature detection unit configured to detect an outside air temperature, and, in the second mode, the control unit controls the first adjustment unit to cause the amount of air when the outside air temperature detected by the temperature detection unit is a first temperature to be more the amount of air when the detected outside air temperature is a second temperature lower than the first temperature.

With this configuration, in the second mode, the air flowing through the air port into the air flow path at the outside air temperature being the first temperature is larger than that at the second temperature lower than the first temperature. Thus, even when the temperature of the air flowing through the air port into the air flow path is relatively high, the air that flows in the air flow path and is discharged through the blowing outlet toward the support surface is increased, and hence the temperature of the air in the region between the heating unit and the support surface is easily lowered. Therefore, a thermal damage caused to the medium transported along the support surface can suitably be suppressed in accordance with the outside air temperature.

(C) In the drying device, in the second mode, the control unit controls the blower to cause air to flow toward the blowing outlet when the outside air temperature detected by the temperature detection unit is the first temperature, the air being more than that at the second temperature.

With this configuration, in the second mode, the amount of the air in the air flow path, which flows toward the blowing outlet, at the outside air temperature being the first temperature is larger than that at the second temperature lower than the first temperature. Thus, even when the temperature of the air flowing through the air port into the air flow path is relatively high, the air that flows in the air flow path and is discharged through the blowing outlet toward the support surface is increased, and hence the temperature of the air in the region between the heating unit and the support surface is easily lowered. Therefore, a thermal damage caused to the medium transported along the support surface can suitably be suppressed to a further extent in accordance with the outside air temperature.

(D) In the drying device, the heating unit includes a humidity detection unit configured to detect humidity in a region between the heating unit and the support surface, and, in the second mode, the control unit controls the blower and the first adjustment unit, based on a result detected by the humidity detection unit.

With this configuration, in the second mode, the blower and the first adjustment unit can be controlled based on the humidity in the region between the heating unit and the support surface.

(E) In the drying device, the heating unit includes a second adjustment unit configured to adjust an opening degree of the suction inlet, and the control unit controls the second adjustment unit to open the suction inlet in the first mode, and controls the second adjustment unit to cause an opening degree of the suction inlet in the second mode to be smaller than an opening degree of the suction inlet in the first mode.

With this configuration, second adjustment unit is capable of adjusting the opening degree of the suction inlet. As the opening degree of the suction inlet adjusted by the second adjustment unit is larger, the air flowing from the region between the heating unit and the support surface through the suction inlet into the air flow path is increased. In the second mode, the second adjustment unit performs adjustment so that the opening degree of the suction inlet is smaller than the opening degree of the suction inlet in the first mode. Here, the opening degree of the suction port, which is smaller than the opening degree of the suction port in the first mode, includes an opening degree at which the suction port is not opened. Thus, the opening degree of the suction inlet in the first mode is adjusted to an opening degree larger than that in the second mode, and hence the warm air in the region between the heating unit and the support surface easily flows through the suction inlet into the air flow path. Therefore, the temperature of the air flowing in the air flow path can be raised. Thus, the air discharged through the blowing outlet from the air flow path toward the support surface easily raises the temperature of the air in the region between the heating unit and the support surface. Therefore, evaporation of moisture of the liquid adhering to the medium transported along the support surface and drying of the medium to which the liquid adheres can further be promoted. The suction port in the second mode is adjusted to have an opening degree smaller than the opening degree of the suction port in the first mode. Thus, the warm air in the region between the heating unit and the support surface is less likely to flow through the suction inlet into the air flow path. Therefore, rise of the temperature of the air flowing in the air flow path can be suppressed. Thus, the air discharged through the blowing outlet from the air flow path toward the support surface easily lowers the temperature of the air in the region between the heating unit and the support surface. Therefore, a thermal damage caused to the medium transported along the support surface can further be suppressed.

(F) In the drying device, the heating unit has, inside the duct, a partition wall that separates the air flow path and the heating section, and when, in the air flow path, a portion thereof aligned with the heating section through intermediation of the partition wall in an orthogonal direction orthogonal to the support surface is regarded as a parallel installation portion, the air port is in communication with the air flow path downstream of the parallel installation portion in a flowing direction of air flowing through the air flow path.

With this configuration, the air port is in communication with the air flow path downstream of the parallel installation portion being a portion of the air flow path, which is aligned with the heating section through intermediation of the partition wall in the orthogonal direction orthogonal to the support surface. Thus, the air flowing through the air port from the outside of the duct into the air flow path is less likely to flow through the parallel installation portion. Therefore, the cooler air can be discharged through the blowing outlet from the air flow path toward the support surface.

(G) In the drying device, the partition wall contains a heat insulating material.

With this configuration, the partition wall that separates the air flow path and the heating section contains the heat insulating material. Thus, the air flowing through the air port from the outside of the duct into the air flow path is less likely to be heated by the heating section. Therefore, the cooler air can be discharged through the blowing outlet from the air flow path toward the support surface.

(H) The drying device further includes a removal member configured to remove a foreign matter from the air flowing through the air port.

With this configuration, the drying device includes the removal member that removes a foreign matter from the air flowing through the air port. Thus, a foreign matter can be prevented from entering the air flow path through the air port.

(I) A printing apparatus includes a transport unit configured to transport a medium, a printing unit configured to perform printing on the medium transported by the transport unit, a support unit configured to support, on a support surface, the medium after printing performed by the printing unit, a heating unit facing the support surface and being configured to heat the medium supported on the support surface after printing, and a control unit configured to control the heating unit. In the printing apparatus, the heating unit includes a duct having a blowing outlet through which air is blown out toward the support surface, a suction inlet through which the air blown out through the blowing outlet toward the support surface is sucked, and an air port being different from the blowing outlet and the suction inlet, and including an air flow path through which the air is flowable, a heating section configured to heat at least one of the air in the air flow path and the medium supported on the support surface, a blower configured to cause the air in the air flow path to flow toward the blowing outlet, and a first adjustment unit configured to adjust an amount of air flowing into the air flow path from an outside of the duct through the air port, the duct has a facing region facing the support surface and a non-facing region not facing the support surface, the air port is provided in the non-facing region, and the control unit is configured to execute a first mode in which the first adjustment unit is controlled to adjust the amount of air in a state in which the heating section performs heating and a second mode in which the first adjustment unit is controlled to cause the amount of air to be more than the amount of air in the first mode in a state in which heating by the heating section is stopped.

With this configuration, the first adjustment unit is capable of adjusting the amount of air flowing into the air flow path from the outside of the duct through the air port. The air port is provided in the non-facing region of the duct, which does not face the support surface. Thus, the air having a temperature lower than the air in the region between the heating unit and the support surface can flow through the air port into the air flow path. In the first mode, heating by the heating section is performed, and the first adjustment unit adjusts the amount of air. In the second mode, heating by the heating section is stopped, and the first adjustment unit performs adjustment so that the amount of air in the second mode is larger than the amount of air in the first mode. Thus, in the second mode, the temperature of the air that flows in the air flow path and is discharged through the blowing outlet toward the support surface can be lowered than that in the first mode, and hence, in the second mode, the temperature of the air in the region between the heating unit and the support surface is easily lowered. Therefore, a thermal damage caused to the medium transported along the support surface can be suppressed.

What is claimed is:

1. A drying device, comprising:

a support unit configured to support, on a support surface, a medium transported after printing;

a heating unit facing the support surface and being configured to heat the medium supported on the support surface after printing; and a control unit configured to control the heating unit, wherein the heating unit includes:

a duct having a blowing outlet through which air is blown out toward the support surface, a suction inlet through which the air blown out through the blowing outlet toward the support surface is sucked, and an air port being different from the blowing outlet and the suction inlet, and including an air flow path through which the air is flowable;

a heating section configured to heat at least one of the air in the air flow path and the medium supported on the support surface;

a blower configured to cause the air in the air flow path to flow toward the blowing outlet; and a first adjustment unit configured to adjust an amount of air flowing into the air flow path from an outside of the duct through the air port, the duct has a facing region facing the support surface and a non-facing region not facing the support surface, the air port is disposed in the non-facing region, and the control unit is configured to execute a first mode in which the first adjustment unit is controlled to adjust the amount of air in a state in which the heating section performs heating and a second mode in which the first adjustment unit is controlled to cause the amount of air to be more than the amount of air in the first mode in a state in which heating by the heating section is stopped, wherein the heating unit includes a second adjustment unit configured to adjust an opening degree of the suction inlet, and the control unit controls the second adjustment unit to open the suction inlet in the first mode, and controls the second adjustment unit to cause an opening degree of the suction inlet in the second mode to be smaller than an opening degree of the suction inlet in the first mode.

2. The drying device according to claim 1, wherein the heating unit includes a humidity detection unit configured to detect humidity in a region between the heating unit and the support surface, and in the second mode, the control unit controls the blower and the first adjustment unit, based on a result detected by the humidity detection unit.

3. The drying device according to claim 1, wherein the heating unit has, inside the duct, a partition wall that separates the air flow path and the heating section, and when, in the air flow path, a portion thereof aligned with the heating section through intermediation of the partition wall in an orthogonal direction orthogonal to the support surface is regarded as a parallel installation portion, the air port is in communication with the air flow path downstream of the parallel installation portion in a flowing direction of air flowing through the air flow path.

4. The drying device according to claim 3, wherein the partition wall contains a heat insulating material.

5. The drying device according to claim 1, comprising a removal member configured to remove a foreign matter from the air flowing through the air port.

6. A drying device, comprising:

a support unit configured to support, on a support surface, a medium transported after printing;

a heating unit facing the support surface and being configured to heat the medium supported on the support surface after printing; and a control unit configured to control the heating unit, wherein the heating unit includes:

a duct having a blowing outlet through which air is blown out toward the support surface, a suction inlet through which the air blown out through the blowing outlet toward the support surface is sucked, and an air port being different from the blowing outlet and the suction inlet, and including an air flow path through which the air is flowable;

a heating section configured to heat at least one of the air in the air flow path and the medium supported on the support surface;

a blower configured to cause the air in the air flow path to flow toward the blowing outlet; and a first adjustment unit configured to adjust an amount of air flowing into the air flow path from an outside of the duct through the air port, the duct has a facing region facing the support surface and a non-facing region not facing the support surface, the air port is disposed in the non-facing region, and the control unit is configured to execute a first mode in which the first adjustment unit is controlled to adjust the amount of air in a state in which the heating section performs heating and a second mode in which the first adjustment unit is controlled to cause the amount of air to be more than the amount of air in the first mode in a state in which heating by the heating section is stopped, wherein the heating unit includes a temperature detection unit configured to detect an outside air temperature, and in the second mode, the control unit controls the first adjustment unit to increase the amount of air when the outside air temperature detected by the temperature detection unit is a first temperature to be more than the amount of air when the detected outside air temperature is a second temperature lower than the first temperature.

7. The drying device according to claim 6, wherein in the second mode, the control unit controls the blower to cause more air to flow toward the blowing outlet when the outside air temperature detected by the temperature detection unit is the first temperature than when the detected outside air temperature is the second temperature.

8. A printing apparatus, comprising:

a transport unit configured to transport a medium;

a printing unit configured to perform printing on the medium transported by the transport unit;

a support unit configured to support, on a support surface, the medium after printing performed by the printing unit;

a heating unit facing the support surface and being configured to heat the medium supported on the support surface after printing; and a control unit configured to control the heating unit, wherein the heating unit includes:

a duct having a blowing outlet through which air is blown out toward the support surface, a suction inlet through which the air blown out through the blowing outlet toward the support surface is sucked, and an air port being different from the blowing outlet and the suction inlet, and including an air flow path through which the air is flowable;

a heating section configured to heat at least one of the air in the air flow path and the medium supported on the support surface;

a blower configured to cause the air in the air flow path to flow toward the blowing outlet; and a first adjustment unit configured to adjust an amount of air flowing into the air flow path from an outside of the duct through the air port, the duct has a facing region facing the support surface and a non-facing region not facing the support surface, the air port is disposed in the non-facing region, and the control unit is configured to execute a first mode in which the first adjustment unit is controlled to adjust the amount of air in a state in which the heating section performs heating and a second mode in which the first adjustment unit is controlled to cause the amount of air to be more than the amount of air in the first mode in a state in which heating by the heating section is stopped, wherein the heating unit includes a second adjustment unit configured to adjust an opening degree of the suction inlet, and the control unit controls the second adjustment unit to open the suction inlet in the first mode, and controls the second adjustment unit to cause an opening degree of the suction inlet in the second mode to be smaller than an opening degree of the suction inlet in the first mode.

* * * * *